3,373,176
TERTAMETHYL CYCLOBUTANEDIOL DIESTERS OF LINSEED-DERIVED $C_{18}$ SATURATED VICINALLY SUBSTITUTED CYCLIC MONOCARBOXYLIC ACID ISOMER MIXTURE
John P. Friedrich, Green Valley, Ill., assignor to the United States of America as represented by the Secretary of Agriculture
No Drawing. Filed Sept. 22, 1965, Ser. No. 489,435
1 Claim. (Cl. 260—410)

ABSTRACT OF THE DISCLOSURE

The diesters formed by reacting a de-aromatized cyclized linolenic acid isomer mixture with two equivalents of tetramethyl cyclobutanediol exhibit low pour points coupled with high resistance to thermal oxidation. The product meets current military specifications for aviation lubricants.

---

A nonexclusive, irrevocable royalty-free license in the invention herein described, throughout the world for all purposes of the United States Government, with the power to grant sublicenses for such purposes, is hereby granted to the government of the United States of America.

This invention, which is an extension of the invention described in my copending but now abandoned application S.N. 449,652, filed Apr. 20, 1965, relates particularly to the novel 2,2-4,4-tetramethyl-1,3-cyclobutanediol diester product of the linseed derived saturated $C_{18}$ cyclic acid isomer mixture, which novel diester product in the presence of evidently sub-optimal amine inhibitors exhibits surprisingly little oxidative deterioration from being heated at 400° F. for 72 hours in the presence of air as defined for aviation lubricants in specification MIL-L-23699 and also exhibits a desirably low pour point and a high viscosity index. Thus, it is reasonable to expect that when my diester product is expertly compounded with the more effective but apparently trade secret oxidation inhibitors that are currently used in certain lubricants that are known to meet MIL-L-23699 it should be a particularly valuable base stock component for aviation type lubricants.

In my above mentioned parent application I have disclosed and claimed the $C_4$-$C_7$ straight and branched chain alcohol monoesters, i.e., the n-butyl, m-pentyl, m-hexyl, n-heptyl, neopentyl, and 2,2-dimethylpentyl monoesters of the known saturated $C_{18}$ vicinally disubstituted cyclic monocarboxylic acid mixed isomers, which starting saturated cyclic acid isomer mixture is formed in a prolonged alkali isomerization of linolenic acid or of linseed oil dissolved in ethylene glycol as taught by Eisenhauer et al., JAOCS 40:129 (1963), the crude $C_{18}$ cyclic acid product then being successively hydrogenated in 50-percent glacial acetic acid to eliminate the oxidation-sensitive $C_{18}$ aromatic analogs, subjected to crystallization from acetone at 0° C. to eliminate most of the straight chain saturates, and finally completely purified by a urea adduction step.

While the oxidative stabilities of the cyclic acid monoesters disclosed in my application S.N. 449,652 in some respects even surpass those defined for aviation type lubricant materials in terms of bis-2-ethylhexyl sebacate that has been blown for 72 hours at 347° F. as set forth in military specification MIL-L-7808 (1955), the said L-7808 specification has now been augmented by a more rigorous specification, namely MIL-L-23699 (1963), which latter optional specification requires aviation type lubricant materials to show only slight oxidative changes from being blown for 72 hours at 400° F. instead of at 347° F. as in the old specification.

As pointed out in now abandoned application S.N. 449,652, the prior art ester lubricant base stocks such as the 2-ethylhexyl or the oxo-alcohol diesters of sebacic, adipic, or azelaic acid that are still used to some extent in the compounding of aviation and jet engine lubricants represent a compromise in which the well known oxidative instabilty of alcohols containing a hydrogen that is both beta and tertiary is tolerated in order to obtain the required low temperature fluidity contributed by the branched nature of the esterifying alcohol.

My copending application, S.N. 449,652, which I hereby incorporate by reference, discloses my discovery that certain straight and branched chain alcohol monoesters of the linolenic acid derived $C_{18}$ vicinally disubstituted saturated cyclic monocarboxylic acid mixed isomers exhibit not only the low pour points characteristic of the cyclic acids per se plus good low temperature properties but also surprisingly little oxidative deterioration from being heated at 347° F. for 72 hours in the presence of air, particularly in view of the existence of an oxidation-sensitive tertiary hydrogen at each of the substituted vicinal carbons of the saturated ring. Thus, my earlier application shows one way to eliminate the previous need in ester lubricant base stocks of branched chain alcohols containing oxidation-sensitive beta and tertiary hydrogen.

Inasmuch as the higher temperature specified in MIL-L-23699 requires the presence of distinctly greater oxidative stabilities, I have further discovered that when the novel diester product that I have now synthesized by reacting one mole of 2,2-4,4-tetramethyl-1,3-cyclobutanediol with two moles of the aromatic-free saturated $C_{18}$ cyclic acid isomers is subjected in the presence of apparently suboptimal inhibitors to the conditions of MIL-L-23699, the product exhibits an unobvious stability towards oxidation and thermal degradation as shown by the fact that it impressively passes the acid value and sludge requirements of the specification. Although Table 1 shows that my cyclobutanediol ester product, inhibited by the addition of 1 percent by weight of an equal mixture of phenyl-α-naphthylamine and p-p′-dioctyl diphenylamine, greatly exceeds the permitted percentage increase in viscosity, the fact that a commercially available pentaerythritol ester to which I added the same inhibitors also showed an excessive increase in viscosity as well as an increase in acid number to almost 6 times the permitted maximum whereas the same commercially available pentaerythritol ester when compounded with highly secret inhibitors is known to pass MIL-L-23699 indicates that the difficulty lies in the inhibitors rather than in my novel product, and that it would involve only routine tests for those skilled in the lubrication art to employ more efficient oxidation inhibitors and to blend my diester, as is conventional, with suitable proportions of other esters, detergents, acid binding agents, etc. to easily achieve the limits defined in MIL-L-23699.

It is pointed out that the analogous diester of 1,4-benzene dimethanol, the diester of 1,4-cyclohexane-bis methanol, and the cyclic acid monoester of 2,2-dimethylpentanol, each inhibited with the said amine mixture and then subjected to the thermal oxidation conditions of MIL-L-23699, simply decomposed, whereby the extremely large amounts of sludge defied all attempts at separation. The amine inhibited 2,2-dimethyl-1,3-propanediol diester after only 24 hours of blowing at 400° F. already showed more than a 200 percent increase in viscosity and an acid number of 6.7.

The preparation of my novel diester low temperature lubricant base, which has the following formula, is set forth in Example 1.

following procedure was employed. The esterified mixed isomers were packed in Dry Ice overnight. The intensely cold samples (−79° C.) were then placed in an air bath and the air bath in turn immersed in a Dewar flask containing isopropanol and Dry Ice. The temperature was allowed to rise at the rate of 2° C. per hour, and the temperature at which the surface of the sample would deform in 5 seconds when tipped was arbitrarily called the pour point.

The oxidative stabilities of my novel esters were determined by the following procedure. A 10-g. sample of ester containing 100 mg. of an equal mixture of phenyl-$\alpha$-naphthylamine and p-p′-dioctyldiphenylamine was placed in a 30-ml. vial. A capillary tube was inserted to the bottom of the vial, and filtered compressed air was metered at 500 cc./hr. for 72 hours, the vial being immersed in a stirred oil bath held at 400° F.±1.0° F. After, filtration to remove traces of solids, the acid value and viscosity of the sample were redetermined.

TABLE 1

| Ester | Viscosity cs. | | | Acid number | | Pour point, °F. | Sludge formed formed after Δ | Viscosity index |
|---|---|---|---|---|---|---|---|---|
| | 100° F. | | 210° F. | | | | | |
| | Pre Δ | Percent Increase after Δ | Pre Δ | Pre Δ | After Δ | | | |
| (1) 2.2-4,4-tetramethyl-1,3-cyclobutanediol | 169 | 377 | 16.4 | 0 | <1 | −36 | None | 103 |
| (2) 1,4-cyclohexane-bis methanol | 220 | [1] 70 | 19.6 | 0 | [1] 6.7 | −35 | Large amount | 103 |
| (3) 2,2-dimethyl-1,3-propanediol (discontinued at 24 hrs. of 400° F.) | 170 | 216 | 11.7 | 0 | 6.7 | −44 | None so far | 43 |
| (4) 1,4-benzene dimethanol | 122 | [2] | 14.1 | 0 | [2] | −38 | All sludge | 118 |
| (5) 2,2-dimethylpentanol | 19.9 | [2] | 3.71 | 0 | [2] | −79 | do | 97 |
| (6) "Herclube C" [3] | 17.7 | 36 | 3.8 | 0 | 17.3 | <−100 | None | 120 |
| (7) Blend 24% of (1) and 76% of (6) | 28.1 | 71 | 5.23 | 0 | 14 | −71 | do | 130 |

[1] Filtrate.
[2] Impossible because of massive sludge.
[3] Proprietary diester low temp. lube base stock of Hercules Powder Co., Wilmington, Delaware.

Δ Blown as reg'd in MIL-L-23699.
NOTE.—MIL-L-23699—limits viscosity at 210° F. to 5.0–5.5 cs.; percent viscosity incr. on heating −5% to +25%; acid No., max. 3.0; sludge, not in excess of 1 g. per 100 ml.

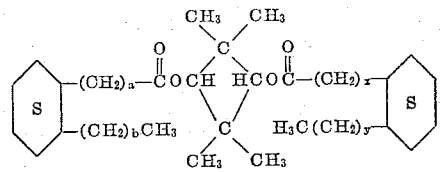

wherein the sum of $(a+b)=10$ and the sum of $(x+y)$ also $=10$

Example 1

Into a 1-liter round-bottom flask equipped with a water trap, a reflux condenser, and boiling chips, were introduced 36 g. (0.25 mole) of 2,2,4,4-tetramethyl-1,3-cyclobutanediol, 282 g. (1 mole) of the highly purified hydrogenated $C_{18}$ cyclic acid mixed isomers, and 300 ml. of toulene. The flask was heated to a boil (120° C.) and the contents refluxed until 8.5 g. of water (9.0 g. theoretical) had collected in the trap. After removing the toluene solvent under vacuum, the mixture of diester product and unreacted cyclic acid starting material was subjected to molecular distillation at 10 microns pressure; approximately 140 g. of unreacted cyclic acid, B.P. 90–110° C. and 145 g. of the cyclic acid diester product, B.P. 155–165° C., were recovered. The diester having an acid number of 2 was passed through an alumina column thereby lowering the acid number to practically zero. The water-white diester also had an iodine number of zero.

The viscosities at 100° F. and 210° F. shown in Table 1 were determined in Ostwald-Fenske pipettes and were plotted on ASTM standard viscosity charts for liquid petroleum products (D341), thereby permitting extrapolation of the viscosity at −40° F. The viscosity index for each ester was obtained from the viscosities at 100° and 210° F. in accordance with ASTM Method D567–41.

Since the equipment required for determining pour points by ASTM Method D97–47 was not available, the following procedure was employed. The esterified mixed isomers were packed in Dry Ice overnight. The intensely cold samples (−79° C.) were then placed in an air bath and the air bath in turn immersed in a Dewar flask containing isopropanol and Dry Ice. The temperature was allowed to rise at the rate of 2° C. per hour, and the temperature at which the surface of the sample would deform in 5 seconds when tipped was arbitrarily called the pour point.

Example 2.—n-Pentyl Ester

Purified saturated $C_{18}$ cyclic acid isomer mixture, 25 g., n-pentyl alcohol, 50 g., and $BF_3$-etherate complex, 6 g. were introduced into a loosely stoppered 125 ml. Erlenmeyer flask and heated for 2 hours at 60–80° C. The cooled contents were added to a large excess of water in a separatory funnel, and petroleum ether, 50 ml., was then added to facilitate phase separation. After washing the organic layer twice with distilled water and drying, the ether was removed under vacuum. Unreacted pentyl alcohol was distilled off and the crude ester containing about 2 percent of unreacted cyclic acids was placed on a column of basic alumina. The ester was eluted with petroleum ether which was then removed under vacuum. Distillation of the ester at 0.1 mm. and 135–155° C. gave 33 g. of the ester product.

The viscosities at 100° F. and 210° F. shown in Table 1 were determined in Ostwald-Fenske pipettes and were plotted on ASTM standard viscosity charts for liquid petroleum products (D341), thereby permitting extrapolation of the viscosity at −65° F. The viscosity index for each ester was obtained from the viscosities at 100° F. and 210° F. in accordance with ASTM Method D567–41.

Since the equipment required for determining pour points by ASTM Method D97–47 was not available, the following procedure was employed. The esterified mixed isomers were packed in Dry Ice overnight. The intensely cold samples (−79° C.) were then placed in an air bath and the air bath in turn immersed in a Dewar flask containing isopropanol and Dry Ice. The temperature was allowed to rise at the rate of 2° C. per hour, and the temperature at which the surface of the sample would deform in 5 seconds when tipped was arbitrarily called the pour point.

The oxidative stabilities of this monoester of S.N. 449,652 were determined by the following procedure. A 10-g. sample of ester containing 50 mg. of phenothiazine inhibitor and 1 sq. cm. of 0.005-inch copper foil was placed in a 30-ml. vial. A capillary tube was inserted to the bottom of the vial, and filtered compressed air was metered at 500 cc./hr. for 72 hours, the vial being immersed in a stirred oil bath held at 175.5° C.±0.5° C. After filtration to remove traces of solids, the acid value and viscosity of the sample were redetermined.

I claim:
1. The mixed 2,2-4,4-tetramethyl-1,3-cyclobutanediol diesters of the linolenic acid derived saturated vicinally disubstituted monocarboxylic $C_{18}$ cyclic acid isomers, the mixed diesters having the formula

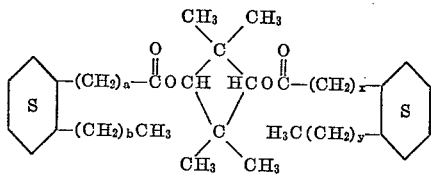

wherein the sum of $(a+b)=10$ and the sum of $(x+y)$ also $=10$.

No references cited.

HENRY R. JILES, *Primary Examiner.*